US006274867B1

(12) United States Patent
Wells et al.

(10) Patent No.: US 6,274,867 B1
(45) Date of Patent: Aug. 14, 2001

(54) MULTIPLE LIQUID FLOW ELECTROSPRAY INTERFACE

(75) Inventors: Gregory J. Wells, Fairfield; Roger C. Tong, Berkeley; Peter P. Yee, San Ramon, all of CA (US)

(73) Assignee: Varian, Inc., Palo Alto, CA (US)

( * ) Notice: Subject to any disclaimer, the term of this patent is extended or adjusted under 35 U.S.C. 154(b) by 0 days.

(21) Appl. No.: 09/162,259

(22) Filed: Sep. 28, 1998

(51) Int. Cl.[7] .............................. H01J 49/00; B01D 59/44
(52) U.S. Cl. .............................. 250/288
(58) Field of Search .............................. 250/288, 282; 259/4

(56) References Cited

U.S. PATENT DOCUMENTS

| | | | | |
|---|---|---|---|---|
| 3,506,244 | * | 4/1970 | Strang | 259/4 |
| 4,667,100 | * | 5/1987 | Lagna | 250/282 |
| 5,170,053 | | 12/1992 | Hail et al. . | |
| 5,393,975 | | 2/1995 | Hail et al. | 250/288 |
| 5,838,002 | * | 11/1998 | Sheehan | 250/288 |
| 5,917,184 | * | 6/1999 | Carson et al. | 250/288 |

FOREIGN PATENT DOCUMENTS

55128760 * 3/1982 (JP) .

* cited by examiner

*Primary Examiner*—Jack Berman
*Assistant Examiner*—Johnnie L Smith
(74) *Attorney, Agent, or Firm*—Edwards H. Berkowitz

(57) ABSTRACT

An apparatus for electrospray ionization of a liquid sample matrix to prepare the sample for introduction into a mass spectrometer. The inventive electrospray interface is arranged between a source of a liquid sample matrix and an electrospray ionization needle. The interface includes a central chamber which contains elements for passively mixing the liquid sample flow with a modifying liquid added to the central chamber through a side channel. The side channel is isolated from the central chamber by a flow restrictor and the modifying liquid is provided to the side channel through a valve. A second valve, side channel, and flow restrictor are used to permit introduction of a calibration fluid into the central chamber through the first side channel. The inventive interface permits mixing of a modifying liquid with the liquid sample matrix to assist in nebulization of the liquid sample by reducing the surface tension of the sample containing fluid.

8 Claims, 5 Drawing Sheets

FIG. 5(B)
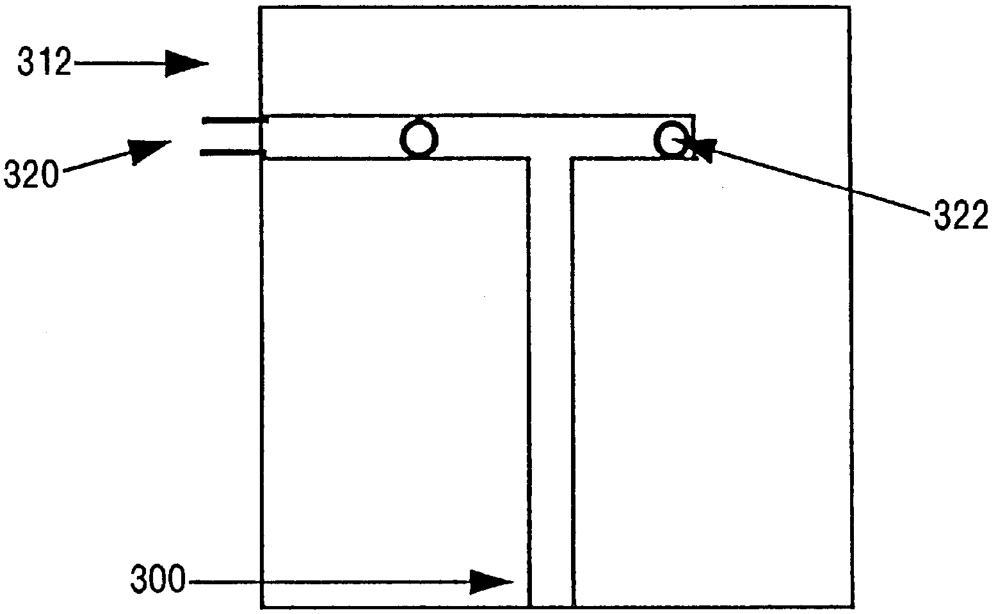
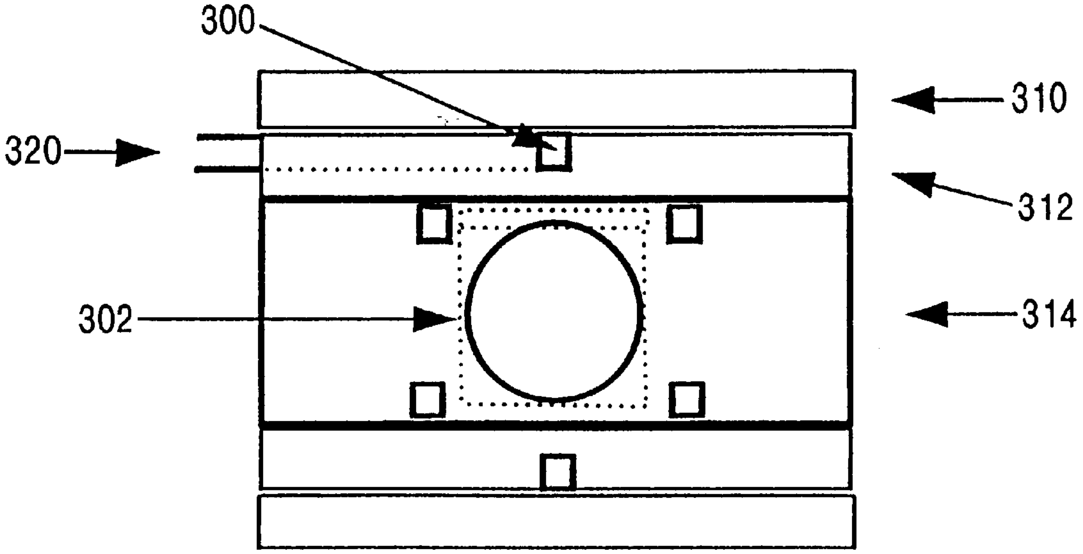
FIG. 5(A)

MULTIPLE LIQUID FLOW ELECTROSPRAY INTERFACE

FIELD OF THE INVENTION

The present invention relates to electrospray apparatus, and more specifically, to an apparatus for mixing a modifying liquid into a liquid sample matrix to improve electrospray injection of the sample matrix into a mass spectrometer.

BACKGROUND OF THE INVENTION

Mass spectrometers have become common tools in chemical analysis. Generally, mass spectrometers operate by separating ionized atoms or molecules based on differences in their mass-to-charge ratio (m/e). A variety of mass spectrometer devices are commonly in use, including ion traps, quadrupole mass filters, and magnetic sector mass analyzers.

The general stages in performing a mass-spectrometric analysis are:

(1) create gas-phase ions from a sample; (2) separate the ions in space or time based on their mass-to-charge ratio; and (3) measure the quantity of ions of each selected mass-to-charge ratio. Thus, in general, a mass spectrometer system consists of means to ionize a sample, a mass-selective analyzer, and an ion detector. In the mass-selective analyzer, magnetic and electric fields may be used, either separately or in combination, to separate the ions based on their mass-to-charge ratio. Hereinafter, the mass-selective analyzer portion of a mass spectrometer system will simply be called a mass spectrometer. Mass spectrometers operate under vacuum conditions.

Accordingly, it is necessary to prepare the sample undergoing analysis for introduction into the vacuum environment of the mass spectrometer. This presents particular problems for high molecular weight compounds or other sample materials which are difficult to volatilize. While liquid chromatography is well suited to separate a liquid sample matrix into its constituent components, it is difficult to introduce the output of a liquid chromatograph (LC) into a mass spectrometer. One technique that has been used for this purpose is the "electrospray" method.

The electrospray or electrospray ionization technique may be used to produce gas-phase ions from a liquid sample matrix to permit introduction of the sample into a mass spectrometer. It is thus useful for providing an interface between a liquid chromatograph and a mass spectrometer. In the electrospray method, the liquid sample to be analyzed is pumped through a capillary tube or needle. A potential difference (of for example, three to four thousand volts) is established between the tip of the electrospray needle and an opposing wall, capillary entrance, or similar structure. The needle can be at an elevated potential and the opposing structure can then be grounded; or the needle can be at ground potential and the opposing structure can be at the elevated potential (and of opposite sign to the first case). The stream of liquid issuing from the needle tip is broken up into highly charged drops by the electric field, forming the electrospray. An inert gas, such as dry nitrogen gas (for example) may also be introduced through a surrounding capillary to enhance nebulization (droplet formation) of the fluid stream.

The electrospray drops consist of sample compounds in a carrier liquid and are electrically charged by the electric potential as they exit the capillary needle. The charged drops are transported in an electric field and injected into the mass spectrometer, which is maintained at a high vacuum. Through the combined effects of a heated counter flow of drying gas and vacuum, the carrier liquid in the drops starts to evaporate giving rise to smaller, increasingly unstable drops from which surface ions are liberated into the vacuum for analysis. The desolvated ions pass through a skimmer cone, and after focusing by an ion lens, into the high vacuum region of the mass spectrometer, where they are separated according to mass-to-charge ratio and detected by an appropriate detector (e.g., a photo-multiplier tube).

Although the electrospray method is very useful for analyzing high molecular weight samples in a carrier liquid, it does have some limitations. For example, commercially available electrospray devices utilizing only electrospray nebulization to form the spray are practically limited to liquid flow rates of 20–30 microliters/min, depending on the solvent composition. Higher liquid flow rates result in unstable and inefficient ionization of the dissolved sample. Since the electrospray needle is typically connected to a liquid chromatograph, this acts as a limitation on the flow rate of the chromatograph.

One method of improving the performance of electrospray devices at higher liquid flow rates is to utilize a pneumatically assisted electrospray needle. One example of such a needle is formed from two concentric, stainless steel capillary tubes. In such a device the sample-containing liquid flows through the inner tube and a nebulizing gas flows through the annular space between the two tubes. This improves the efficiency of the ionization process by improving the ability of the electrospray needle to form small drops from the sample liquid. However, at high sample liquid flow rates into this type of electrospray needle, the drops formed are of such large size that they can degrade the performance of the mass spectrometer (by increasing the noise) if allowed to enter the device. This makes such electrospray needles less desirable for use with liquid chromatographs, which typically have relatively high flow rates at their output.

The use of liquid sample matrices having a high percentage of water in the electrospray method is limited to very low flow rates; even when using pneumatically assisted electrospray techniques. This is because solutions with a high percentage of water are prone to unstable droplet formation, even at very low liquid flow rates. Low surface tension liquids are preferable for use in electrospray ionization since electrostatic dispersion of droplets occurs when coulomb forces exceed those due to surface tension. This situation is more difficult to achieve for water due to its extremely high surface tension (72 dyne/cm) compared to organic liquids such as methanol (24 dyne/cm). Adding a modifying liquid, such as methanol, to an aqueous liquid reduces the surface tension of the liquid and improves the efficiency of electrospray ionization. However, for many chromatographic applications, the addition of an organic modifier liquid to the mobile phase may impair the separation ability of the chromatography process.

The prior art discloses the use of a liquid sheath of modifying liquid which is made to flow outside of the electrospray needle, through which flows the liquid sample matrix. Such a configuration is shown in FIG. 1, in which electrospray needle 100 is surrounded by a tube 102 through which flows a modifying liquid 106. The annular flow of sheath liquid 105 flows to the end of needle 100 where it merges with the inner flow of liquid sample matrix 108. The output of electrospray needle 100 are charged liquid droplets 109.

The art also discloses the use of a liquid sheath of modifying liquid which is made to flow inside of the electrospray needle, which contains a second tube transporting the sample containing aqueous fluid. In this configuration, which is shown in FIG. 2, inner sample tube 101 is displaced inward away from the end of electrospray needle 100 to form a mixing volume 107 for liquid sample matrix 108 and modifying liquid 106.

However, while useful, both of the prior art approaches shown in FIGS. 1 and 2 have disadvantages. The prior art device shown in FIG. 1 has the disadvantage of not providing a means for mixing the two liquids. The outer sheath flow liquid flows over the electrospray needle and joins the inner flow of sample liquid. The flow of inner sample liquid and the outer annular modifying liquid are both laminar flows, so that there is no mixing of the two liquids. While outer liquid 106 with the lower surface tension efficiently forms small droplets, the inner core of high surface tension aqueous liquid containing the sample is inefficiently nebulized into large droplets. This leads to increased noise in the mass spectrometer data.

In addition, while the prior art device shown in FIG. 2 includes a mixing region, it is very inefficient in mixing the two liquids. This is because the modifying liquid moves in an annular flow concentric about the inner flow of sample liquid. Both liquids exhibit laminar flow and very little mixing beyond that in the region of adjacent liquids at the outside of the sample flow occurs in the short mixing volume of this device. Thus, this structure has similar disadvantages to that of the prior art device of FIG. 1.

What is desired is an apparatus to provide an improved method of mixing a modifying liquid into a liquid sample matrix which is flowing into an electrospray ionization source, in order to improve the efficiency of the electrospray ionization process. It is further desired to provide a means to periodically switch a calibration liquid into and out of the liquid sample matrix stream without undesirable carry-over of the calibration material into the electrospray source.

SUMMARY OF THE INVENTION

The present invention is directed to an apparatus for electrospray ionization of a liquid sample matrix to prepare the sample for introduction into a mass spectrometer. The inventive electrospray interface is arranged between a source of a liquid sample matrix and an electrospray ionization needle. The interface includes a central chamber which contains elements for passively mixing the liquid sample flow with a modifying liquid added to the central chamber through a side channel. The side channel is isolated from the central chamber by a flow restrictor and the modifying liquid is provided to the side channel through a valve. A second valve, side channel, and flow restictor may be used to permit introduction of a calibration fluid into the central chamber through the first side channel. The inventive interface permits mixing of a modifying liquid with the liquid sample matrix to assist in nebulization of the liquid sample by reducing the surface tension of the sample containing fluid.

BRIEF DESCRIPTION OF THE DRAWINGS

FIG. 5 is a schematic diagram showing a means of implementing an embodiment of the electrospray apparatus of the present invention.

DETAILED DESCRIPTION OF THE INVENTION

The present invention is directed to an interface placed in the flow of a liquid sample matrix prior to introduction of the liquid to an electrospray needle. The interface permits introduction of a modifying liquid and mixing it with the sample-containing liquid in order to reduce the surface tension of the liquid flowing into the electrospray needle. This improves the efficiency of the electrospray process by increasing the strength of the dispersive coulomb forces between drops relative to the forces arising from surface tension, thereby enhancing droplet formation and reducing noise in the mass spectrometer data.

Figure 1:
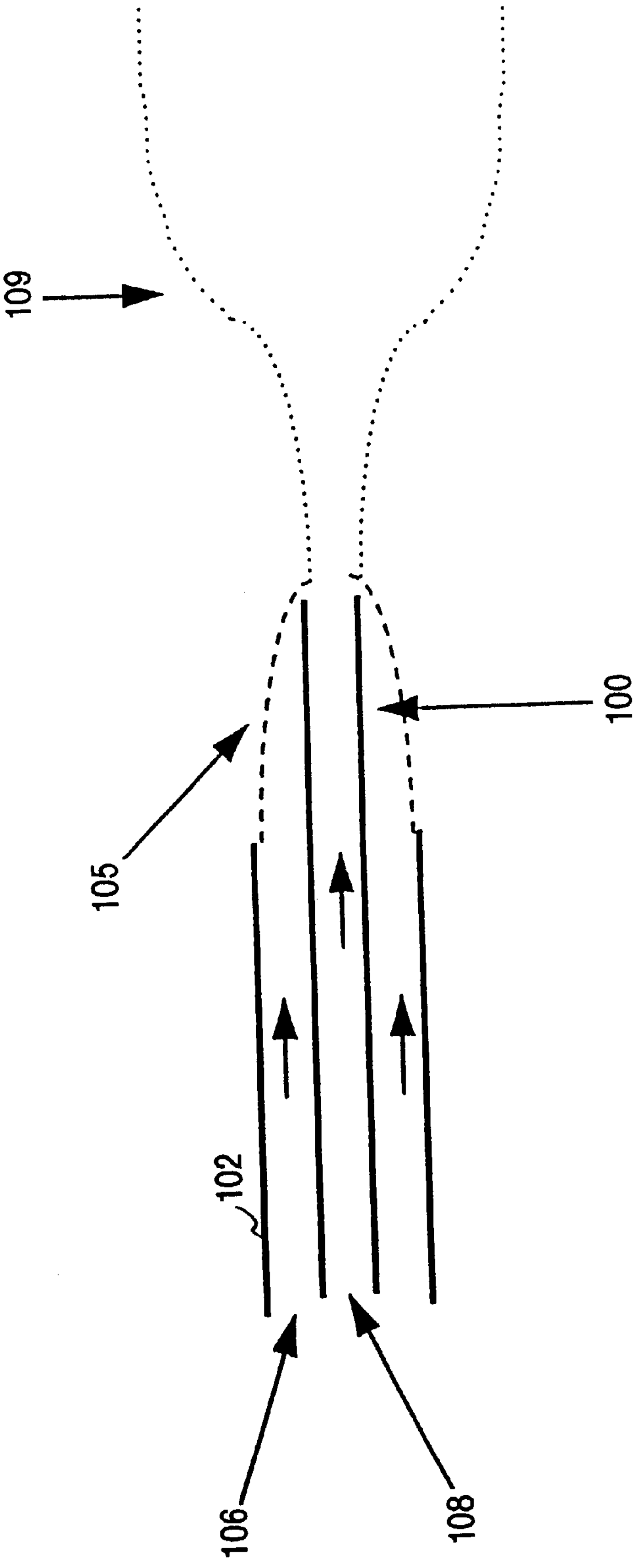
FIG. 1 PRIOR ART
FIG. 1 is a schematic diagram showing a first prior art apparatus for mixing a modifying liquid with a sample containing liquid which is to be formed into charged drops by the electrospray technique.
Figure 2:
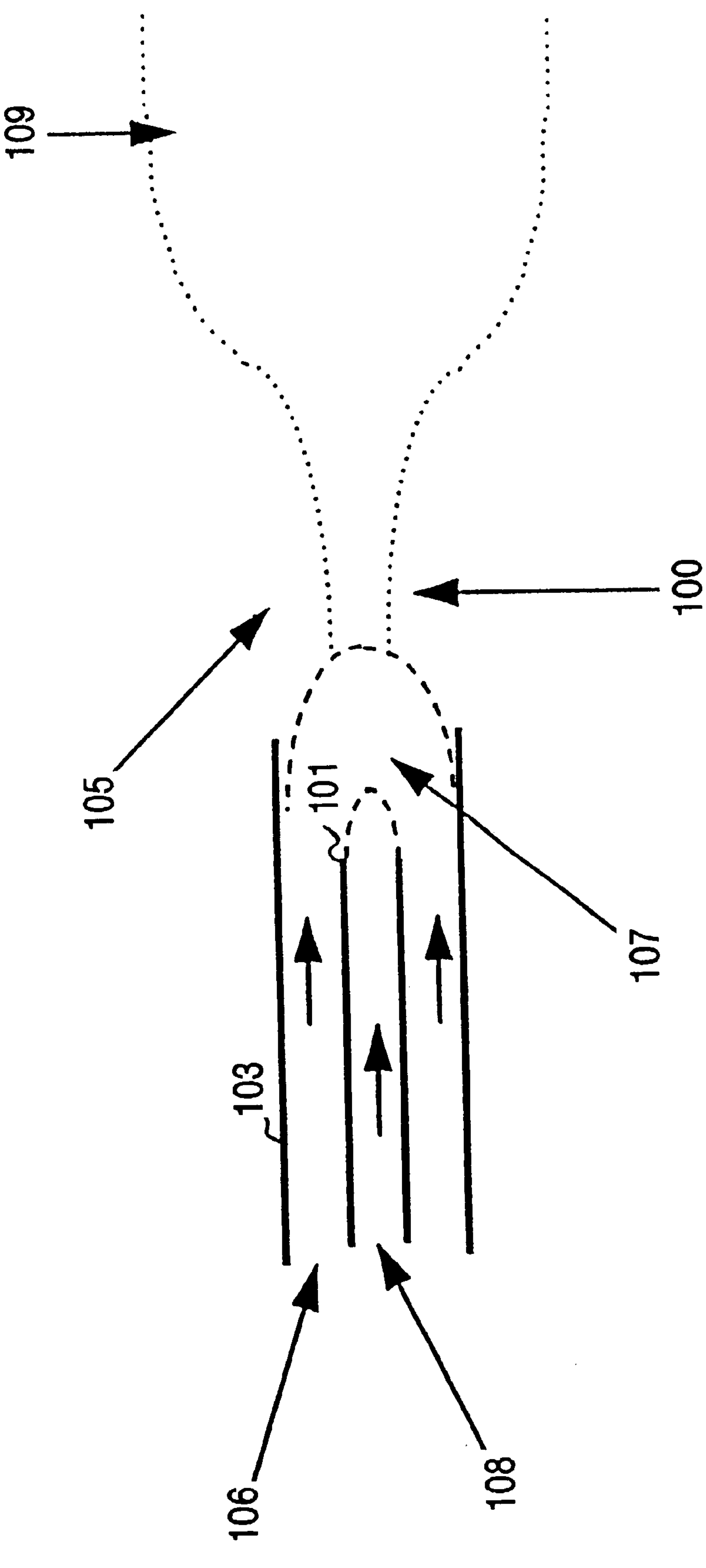
FIG. 2 PRIOR ART
FIG. 2 is a schematic diagram showing a second prior art apparatus for mixing a modifying liquid with a sample containing liquid which is to be formed into charged drops by the electrospray technique.
Figure 3:
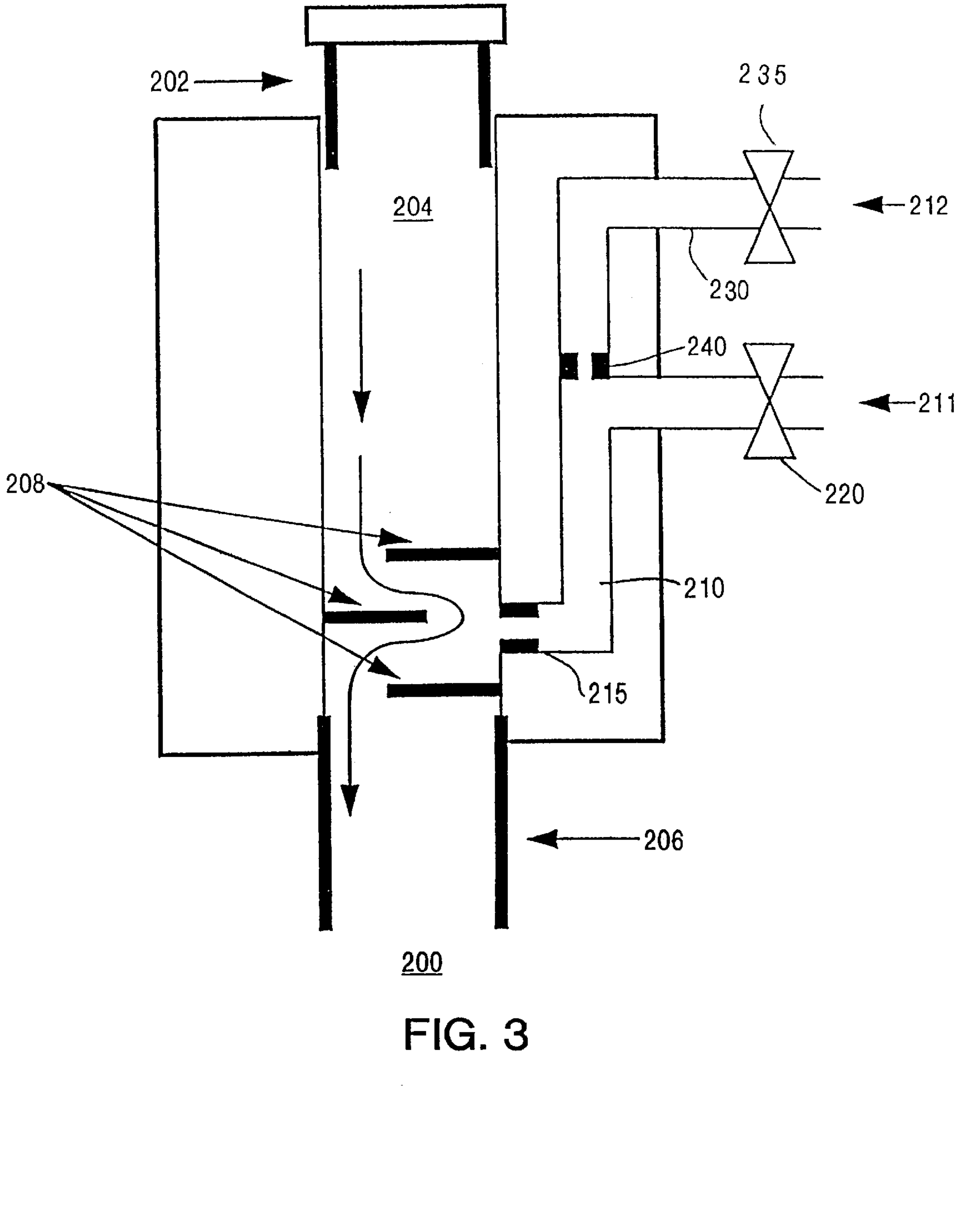
FIG. 3 is a schematic diagram showing a first embodiment of the electrospray apparatus of the present invention.

FIG. 3 is a schematic diagram showing a first embodiment of the electrospray interface 200 of the present invention. A source of a liquid sample matrix, such as the output of a liquid chromatograph 202, is located at one end of a central channel 204 through which the liquid containing the sample flows. At the opposite end of central channel 204 is located electrospray tube 206 which is held at a sufficient potential to initiate electrospray ionization. This causes the liquid flowing from the tube (or needle as it is typically referred to) to be formed into small charged drops through the process of electrospray ionization.

Prior to the entrance of electrospray tube 206 is a connecting side channel (210). At the junction of side channel 210 with central channel 204 is a flow restrictor 215. In the region of the central channel where side channel 210 joins central channel 204 are disposed a series of mixing structures 208 which passively create sufficient mixing so that the liquid flows from central channel 204 and side channel 210 are efficiently mixed prior to entering electrospray tube (needle) 206. The number, type, and physical structure of flow mixers 208 may be varied depending upon the characteristics of the liquid sample matrix and modifying liquid (or gas), or other aspects of the electrospray process. A modifying liquid (or gas) 211 enters side channel 210 through control valve 220. In the preferred embodiment, a second side channel 230 is also employed. The liquid flow of a liquid 212 provided through channel 230 is controlled by valve 235.

When valve 235 is closed and valve 220 is open, no liquid flows through channel 230, but modifying liquid or gas 211 flows through valve 220, then through restrictor 215 into central channel 204. The two flows, 211 and 204 mix in the region of flow mixing structures 208 and enter electrospray needle 206. Restrictor 240 prevents any liquid present in side channel 230 from mixing with liquid 211 in side channel 210.

When control valve 220 is closed and valve 235 is open, a second liquid 212 (e.g., a calibration liquid) from channel 230 flows through restrictors 240 and 215 into central channel 204. If liquid flow 212 through valve 235 is similar to that of 211, but additionally contains a calibration sample, calibration liquid 212 quickly displaces the flow 211 in channel 210 and enters central channel 204. Fluid mixing that occurs at the junction of side channels 230 and 210 will be of minimal significance since the two liquids have similar properties, except for the presence of a calibration compound in liquid 212.

If valve 235 is now closed and valve 220 is opened, channel 210 will be swept clean by the flow 211. If modifying liquid (or gas) 211 is not required for the electrospray process, valve 220 can be closed after displacing the calibration fluid from channel 210.

Desired flow rate(s) of the modifying and calibration liquids can be obtained by the pressure applied to the liquids. Valves 220 and 235 can be simple On/Off valves and do not require low "dead" volumes since no sample containing fluids flow through them.

Alternate embodiments of the present invention include changing the flow 211 to a source of gas, such as nitrogen or air. This serves the purposes of displacing the calibration liquid from channel 210 and preventing mixing of the remaining calibration liquid in channel 230 with the liquid in the central channel 204, by filling channel 210 with a plug of gas. After displacing the fluid from channel 210, valve 220 may again be closed. This is an approach that can be used when a modifying liquid is not needed for efficient electrospray, such as when using a low aqueous content flow in the central channel.

Figure 4:
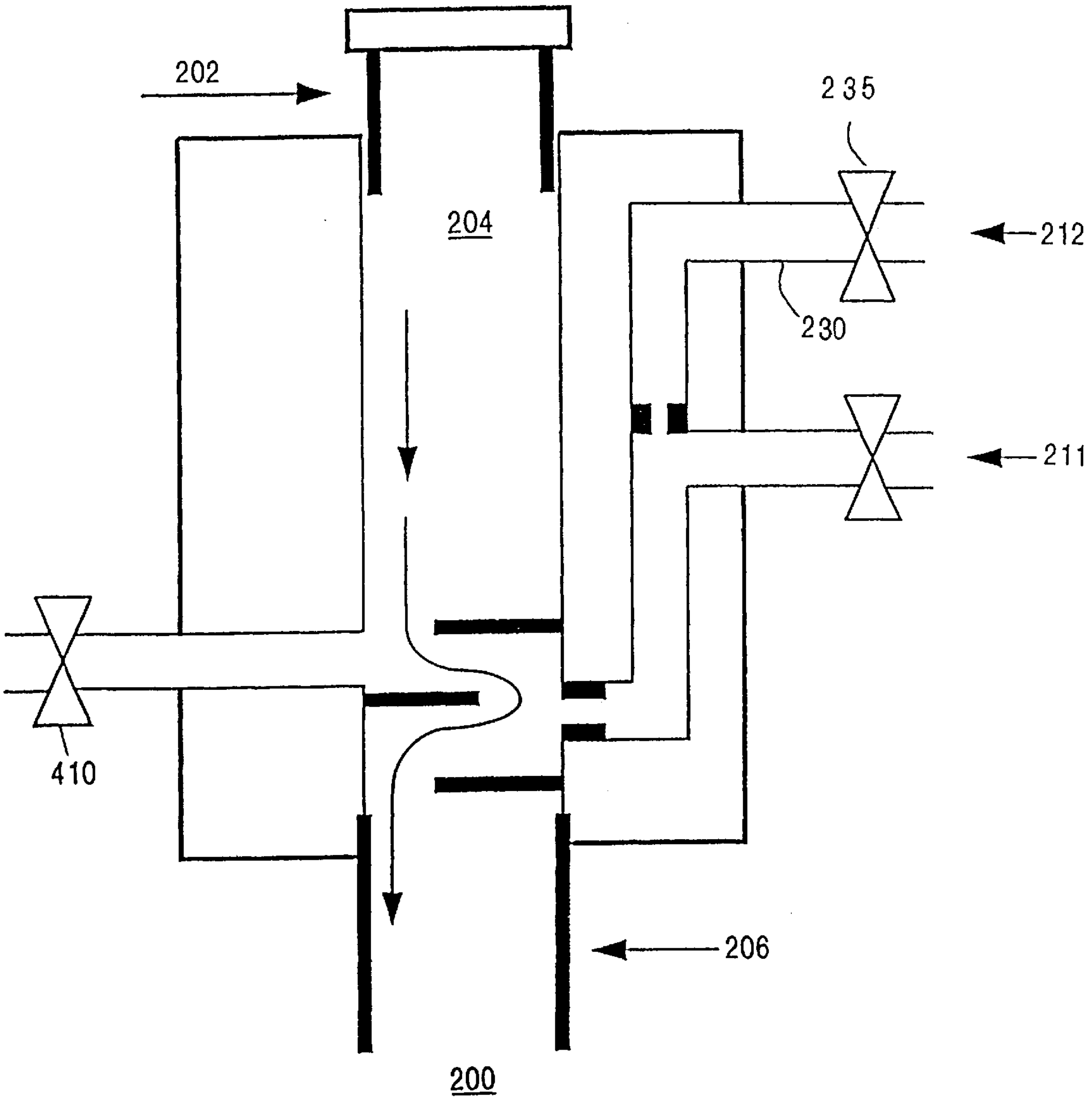
FIG. 4 is a schematic diagram showing a second embodiment of the electrospray apparatus of the present invention.

FIG. 4 is a schematic diagram showing a second embodiment of the electrospray apparatus of the present invention. This embodiment is especially well suited for situations where it is undesirable to have the sample containing liquid mixed with the calibration fluid. In such situations, valve 410 can be opened to allow the diversion of the sample flow through central channel 204 to go through valve 410. When the calibration fluid enters the mixing region (because valve 235 is open) a portion of the calibration fluid 212 will flow out 410, and a portion will flow into electrospray tube 206, permitting calibration without contamination of the calibration fluid by the liquid sample matrix. This mode of operation requires that the pressure on sample liquid 204 be greater in regions away from valve 410 than in regions adjacent to the valve, so that the flow path through valve 410 is preferred over that of going through the main channel.

FIG. 5 is a schematic diagram showing a means of implementing an embodiment of the electrospray apparatus of the present invention. The apparatus of FIG. 5 shows a plurality of channels 300 disposed symmetrically about electrospray needle 302, as shown in the top view of FIG. 5(A). Channels 300 are for the purpose of carrying a nebulizing gas to the tip of the needle, i.e., a gas which increases the formation rate of drops from the fluid flowing through central channel 204.

There are numerous techniques that can be used to fabricate structures of the type needed for implementing the present invention. FIGS. 5(A) and 5(B) show a structure that is comprised of a series of layers, formed with the appropriate channels, sandwiched together and then bonded, to seal each layer to the adjoining layer. Techniques to chemically etch, form, mold, and bond structures of these dimensions are well known in the art (e.g., the semiconductor fabrication industry). In the art, it is also known that the valves could be integrated onto the structure. Alternately, it is known that the electrospray needle could be grounded and the opposing entrance into the mass spectrometer could be at the appropriate voltage to produce electrospray ionization.

In the structure of FIG. 5, a top plate 310, a middle plate 312, and a center plate 314 are formed separately and then bonded together to give the final structure (FIG. 5(A)). Middle plate 312 includes gas inlet 320 which permits introduction of a nebulizing gas, with the gas provided to gas outlets 300 by a channel 322 connecting middle plate 312 to central plate 314.

The advantages of the present invention relative to the prior art include providing a means of adding a modifying liquid and mixing it with the flow of a sample containing fluid prior to entering an electrospray needle and a means of alternating the addition of a modifying liquid and a calibration fluid, and mixing the added liquid to the flow of sample containing fluid prior to entering an electrospray needle. As shown in FIG. 5, the invention can be implemented in the form of a low cost integrated structure having a low mixing volume, no moving parts in the fluid stream containing the sample, and a plurality of gas jets to pneumatically assist nebulization of the combined fluids at the end of an electrospray needle.

The integrated electrospray needle and mixing structure of the present invention permits mixing of a modifying liquid or gas with the sample containing liquid prior to ionization, and the ability to switch a calibration or modifying flow into the sample flow without moving parts being present in the mixing region. Instead, the mixing process is initiated by the flow of liquid through the restrictors contained in the mixing regions and the passive action of the flow mixers. The present invention provides increased capabilities over prior art devices while overcoming the disadvantages of that art by providing a more effective mixing region.

In addition, the present invention overcomes several disadvantages of conventionally used mixing structures, such as mixing tees. A standard mixing tee adds chromatographic band broadening due to incomplete mixing at the tee, and laminar mixing that occurs downstream of the tee. The relatively large downstream volume also limits the flush out time, particularly at low liquid flow rates. The present invention overcomes these problems by providing a serpentine mixing region for more complete mixing of the liquid sample matrix and modifying liquid into a single flow.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. An apparatus for electrospray ionization of a sample, comprising:

a central conduit having an input port for receiving a sample containing liquid and an output port for electrospray ionization;

a flow mixing structure disposed inside the central conduit, in the flow path of the sample containing liquid between said input and output ports;

a first side channel coupled to the central conduit proximate of said flow mixing structure for introducing another fluid through said mixing structure into said central conduit; and a first valve coupled to said first side channel for controlling the flow of fluid through the side channel;

a second side channel having a volume isolated from the central conduit and the first side channel and coupled to the first side channel; and a second valve coupled to the second side channel for controlling the flow of fluid through the second side channel.

2. The apparatus of claim 1, further comprising:

a device coupled to the output of the central conduit for performing electrospray ionization of fluid from the output port.

3. The apparatus of claim 2, further comprising:

a nebulizing gas outlet disposed adjacent to an output port of the electrospray ionization device.

4. An apparatus for performing electrospray ionization of a liquid sample matrix, comprising:

an input port for introduction of the liquid sample matrix;

a central conduit coupled to the input port and having an output port providing an output liquid flow;

a flow mixing structure disposed inside the central conduit in the flow path of the liquid sample matrix and prior to the outport port of the conduit;

a first side channel coupled to the central conduit proximate of said flow mixing structure for introducing another fluid through said mixing structure into said central conduit; and a first valve coupled to the first side channel for controlling the flow of fluid through the side channel; and an electrospray ionization needle coupled to the output port of the central conduit, a second side channel having a volume isolated from the central conduit and the first side channel and coupled to the first side channel; and a second valve coupled to the second side channel for controlling the flow of fluid through the second side channel.

5. The electrospray apparatus of claim 4, further comprising:

a second side channel having a volume isolated from the central conduit and the first side channel and coupled to the first side channel; and a second valve coupled to the second side channel for controlling the flow of fluid through the second side channel.

6. The apparatus of claims 1 or 4 wherein said mixing structure comprises a portion extending upstream of said first channel.

7. The apparatus of claim 6 further comprising a drain channel coupled to said control channel proximate said upstream portion for diverting a portion of said sample containing flow.

8. The apparatus of claim 7 further comprising a drain valve coupled to said drain channel for regulating sail flow.

* * * * *